(12) United States Patent
McCown

(10) Patent No.: US 8,371,286 B2
(45) Date of Patent: Feb. 12, 2013

(54) MECHANICAL DAMPER CONTROL

(76) Inventor: Michael McCown, Bastrop, TX (US)

( * ) Notice: Subject to any disclaimer, the term of this patent is extended or adjusted under 35 U.S.C. 154(b) by 394 days.

(21) Appl. No.: 12/603,741

(22) Filed: Oct. 22, 2009

(65) Prior Publication Data
US 2011/0094496 A1    Apr. 28, 2011

(51) Int. Cl.
F23J 25/08    (2006.01)
F24J 3/02    (2006.01)

(52) U.S. Cl. .................. 126/289; 126/285 B; 126/25 R; 126/77; 126/96; 126/290

(58) Field of Classification Search ............... 126/25 A, 126/25 R, 15 R, 290, 77
See application file for complete search history.

(56) References Cited

U.S. PATENT DOCUMENTS

| | | | |
|---|---|---|---|
| 2,345,519 A | 3/1944 | Wingert | |
| 2,947,240 A | 8/1960 | Bloxsom | |
| 3,096,754 A | 7/1963 | Howrey | |
| 3,134,377 A * | 5/1964 | Kanoy | 126/504 |
| 3,956,852 A * | 5/1976 | Ceausescu et al. | 47/17 |
| 4,052,136 A | 10/1977 | Ulricksen | |
| 4,206,743 A | 6/1980 | Niemela | |
| RE31,112 E * | 12/1982 | Prikkel, III | 236/1 G |
| 4,409,956 A * | 10/1983 | Barnett | 126/290 |
| 4,430,985 A * | 2/1984 | Huneycutt | 126/25 A |
| 4,434,781 A | 3/1984 | Koziol | |
| 4,530,346 A * | 7/1985 | Roy | 126/77 |
| 4,557,185 A * | 12/1985 | Harriman | 454/348 |
| 2003/0170578 A1* | 9/2003 | Weiss | 431/20 |
| 2005/0247304 A1* | 11/2005 | Weiss | 126/504 |

* cited by examiner

Primary Examiner — Steven B McAllister
Assistant Examiner — Nikhil Mashruwala
(74) Attorney, Agent, or Firm — David O. Simmons

(57) ABSTRACT

A mechanical damper control can be used to regulate the temperature of a smoker, barbecue grill, or generally any stove chamber. The mechanical damper control includes a housing that can be coupled to an inlet or outlet of a stove chamber, either directly or using an adapter. A temperature responsive expandable member and a damper are coupled to each other, and to the housing. A damper adjustment can be manipulated to just close the damper at a point when the stove has reached a desired temperature. Further changes in the temperature of the stove chamber cause the expandable member to expand or contract, resulting in a corresponding opening or closing of the damper to maintain the stove chamber at a substantially constant temperature.

23 Claims, 6 Drawing Sheets

MECHANICAL DAMPER CONTROL

FIELD

The present disclosure relates generally to damper controls, and more particularly to mechanical damper controls.

BACKGROUND

When barbecuing, whether in a smoker, on a grill, or otherwise, it can be very important to maintain a constant cooking temperature. Commonly, the temperature within a stove's cooking chamber, or within its fire chamber, is monitored either directly or indirectly with a thermometer or other means, to ensure that it remains sufficiently constant. To maintain a constant temperature, the thermometer must generally be closely monitored, and can be adjusted by either adding fuel to the fire, if needed, or by manually adjusting a vent opening to change the rate at which the fuel burns.

Often, the proper combination of air flow and fuel required to maintain a constant temperature within a stove chamber is determined through a laborious process of trial and error. In some cases, if a stove is not constantly attended, the temperature within a chamber of the stove can vary significantly enough to produce less than optimal results. It is clear therefore that there is room for improvement in conventional methods used to control the temperature of a stove chamber.

SUMMARY

It would be advantageous if the temperature of the stove's chamber could be maintained at an optimum desired temperature without having to constantly attend the stove. Some embodiments of an apparatus described herein are capable of automatically maintain the temperature of a stove chamber at a desired temperature setpoint, without resort to electronic controllers or other complicated devices. Various embodiments, some of which include a housing adapted to be coupled to an opening in a stove chamber, for example an air inlet or exhaust, are described herein. In at least one embodiment, the housing includes an opening through which exhaust gasses of the stove can flow, and a damper is rotatably coupled to the housing such that the damper can rotate about an axis to cover at least a portion of the opening when in a closed position. An expandable member responsive to changes in temperature is coupled to the housing, and includes a first end portion coupled to the damper, and a second end portion joined to the apparatus at a portion of the apparatus that remains a fixed distance from the opening despite changes in temperature.

Some embodiments include a connecting rod having a first end connected to the expandable member and a second end connected to the damper. A travel adjustment can also be provided to adjust a position of the second end of the connecting rod in relation to the damper. A damper adjustment shaft can be rotatably mounted through a wall of the housing and connected to one end of the expandable member, such that rotating the damper adjustment shaft causes the damper to move. In some embodiments, rotating the damper adjustment shaft establishes a temperature setpoint by moving the damper to a closed position during a time when a chamber of the stove is at an operating temperature. A knob can be fixed to a first portion of the damper adjustment shaft that extends outside the housing if desired. The knob can include a movable portion of a detent mechanism configured to mate with a portion of the detent mechanism fixed to the housing.

An adapter can also be provided to facilitate coupling the housing to an exhaust port or other orifice in a stove chamber. The adapter can have a generally tubular first end configured to be coupled to the inlet of the housing, and a second end configured to be fitted over the exhaust port of the stove. In other embodiments, the second end is configured to be fitted into the exhaust port of the stove.

Other embodiments include a tube having a first opening to be coupled to an orifice of a stove chamber, and a second opening in fluid communication with the first opening. A damper is coupled to the second opening, and one end of a temperature-responsive coil is movably coupled to the tube. An elongated force-transfer member is coupled to the other end of the temperature-responsive coil, and to the damper.

In some embodiments, the temperature responsive coil is coupled to the tube via a shaft, so that a temperature setpoint can be established by rotating the shaft. Rather than being directly coupled to the shaft, a sleeve can be positioned about the shaft, and the temperature-responsive coil can be connected to the sleeve. In some embodiments, the sleeve may take the form of a bearing.

An apparatus according to various embodiments can also include a travel adjustment configurable to change an angle through which the damper rotates in response to movement of the elongated force-transfer member. Furthermore, in some embodiments the elongated force transfer member can be slid through an opening in the damper, which allows the damper to be adjusted to a closed position independent of a position of the elongated force transfer member. The elongated force transfer member can then be coupled to the damper using a catch, latch, or fastener. For example, the elongated force transfer member can also have multiple adjustment holes formed along its length, so that a pin can be used to hold the elongated force transfer member in a fixed relationship with the damper.

In some embodiments, a temperature regulating apparatus according to the teachings set forth herein can be implemented as a kit with one or more adapters that facilitate attachment of the temperature regulating apparatus to an opening, e.g. an exhaust pipe of a cook stove such as a smoker or grill. The adapters can be configured to mate with differently shaped cooking stove openings. For example, in one embodiment, a kit includes at least one adapter configured for use with a cooking stove having a kettle portion and a lid portion. The lid portion can have multiple openings, with the adapter having multiple openings corresponding to the plurality of openings formed in the lid portion, and be configured to mate therewith.

BRIEF DESCRIPTION OF THE DRAWINGS

Aspects of this disclosure will become apparent upon reading the following detailed description and upon reference to the accompanying drawings, in which like references indicate similar elements.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

The term "stove" is used herein to refer, generally, to various devices having a chamber in which fuel is burned to generate heat. A stove includes both cooking and non-cooking devices, and is not limited to devices burning a particular type of fuel. For example, stoves burning propane, natural gas, wood, charcoal, and other fuels are all intended to be included in the meaning of the word "stove." Furthermore, the term "stove" is not only intended to encompass smokers, grills, and other apparatus used to cook or preserve foodstuffs, but may also encompass heaters, furnaces, and the like.

Figure 1:
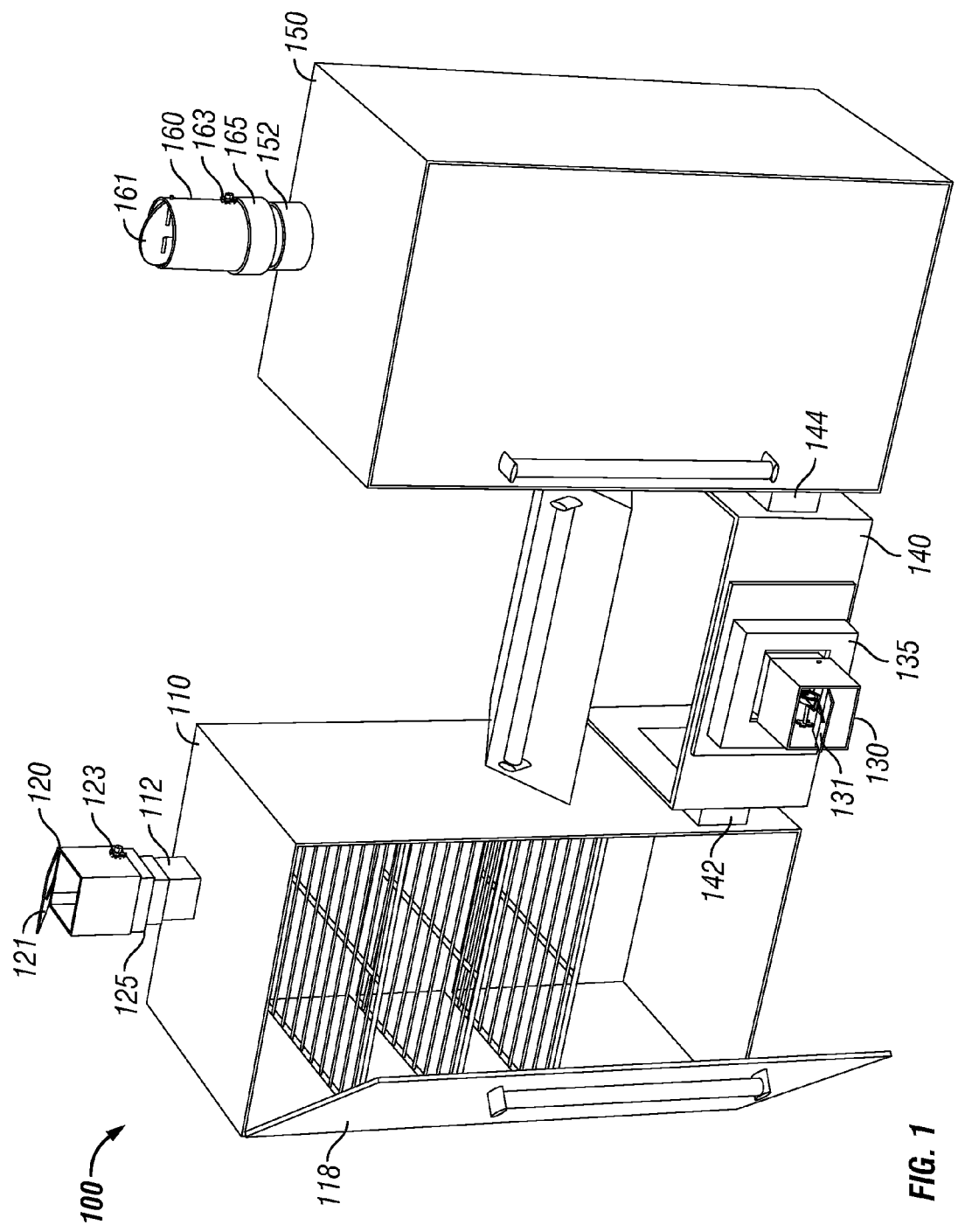
FIG. 1 is a diagram illustrating a smoker having a fire chamber and two smoking chambers, and having an adapter coupled to an opening of each chamber according to an embodiment of the present disclosure.

Referring first to FIG. 1, use of mechanical damper controls on a smoker is discussed according to various embodiments of the present disclosure. Smoker 100 includes, smoking chambers 110 and 150, and fire chamber 140. In operation, a fire is built in chamber 140, and meats or other foodstuffs to be cooked or smoked are placed in smoking chambers 110 and 150. Heat from smoking chamber 140 is channeled to smoking chambers 110 and 150 through heat transfer conduits 142 and 144. As hot air from fire chamber 140 enters smoking chambers 110 and 150, the hot air tends to rise, and leaves smoking chambers 110 and 150 through exhaust outlets 112 and 152, respectively.

As illustrated in FIG. 1, smoker 100 may use more than one mechanical damper control, depending on the configuration and number of chambers included in smoker 100. In the illustrated embodiment, damper controls 120, 130, and 160 are used to control the temperature of each of the three chambers of smoker 100. So, for example, damper control 120 may be used to maintain a relatively constant temperature within smoking chamber 110, damper control 130 may be used to maintain a relatively constant temperature within fire chamber 140, and damper control 160 may be used to keep smoking chamber 150 at a relatively constant temperature. Note that the temperatures in smoking chambers 110 and 150 need not be the same.

Considering smoking chamber 110 in particular, hot air enters smoking chamber 110 from fire box 140 through heat transfer conduit 142. When Door 118 is closed, the hot air is free to flow from the bottom of smoking chamber 110 through exhaust outlet 112, and on through damper control 120. Once smoking chamber 110 has reached a desired temperature, which can be determined by using a thermometer or other conventional means, adjustment knob 123 on damper control 120 can be turned so that damper 121 just closes. As discussed below in greater detail, if the temperature of smoking chamber 110 begins to cool, damper 121 will open, thereby allowing air to flow more easily through smoking chamber 110. If the temperature within smoking chamber 110 later begins to rise, damper 121 will automatically begin to close, and continue to do so until the temperature within smoking chamber 110 reaches the desired cooking temperature. At the desired cooking temperature, damper 121 will once again be closed, and the flow of air through smoking chamber 110 will be restricted. In general, if air cannot flow through damper control 120, more of the heat will tend to be funneled into smoking chamber 150. Or, if damper 161 is also closed, there will be less airflow through fire chamber 140, making it more difficult for the fuel in chamber 142 combust, thereby decreasing the amount of heat generated.

A desired operating temperature of smoking chamber 150 can likewise be maintained by rotating adjustment knob 163 to close damper 161 upon the temperature in smoking chamber 150 reaching the desired operating temperature.

Damper control 130, can likewise be used to control the amount of combustion that takes place in fire chamber 140, by limiting the amount of air available for combustion. Note, however, that in the illustrated embodiment, there is no adjustment knob provided on damper control 130. As discussed subsequently, mechanisms other than an adjustment knob can be used to adjust the position the position of damper 131, or damper control 130 may be configured to maintain a preset operating point that is not easily varied once damper control 130 is put in place on fire chamber 140. In some embodiments, various adjustments can be made prior to placing damper control 130 into position, or damper control 130 may be non-adjustable. Note that even though damper control 130 is placed on an inlet of the fire chamber rather than on an exhaust, its operational principles are similar to those of damper controls 120 and 160.

Damper controls 120, 130, and 160 may be connected to the openings in stove 100 by way of adapters, or damper controls 120, 130 and 160 can be configured for direct connection to the openings. In the illustrated embodiment, damper control 120 has a lower portion 125 configured to fit snugly over an exhaust outlet of smoker chamber 110 having a generally rectangular cross-section. Damper control 160, as illustrated, is configured to mate with generally cylindrical exhaust outlet 152 of smoking chamber 150 using an adapter 165 configured to slide snugly inside of exhaust outlet 152.

The illustrated embodiment shows damper control 130 includes adapter 135, which is configured to fit over an air inlet (not shown) of fire chamber 140. In some embodiments, damper control 130 may be configured to be connected to an opening within a door on fire chamber 140, so that when the door to fire chamber 140 is opened to add fuel, or otherwise access fire chamber 140, damper control 130 is also moved away from the opening to facilitate easy access. In some embodiments, damper control 130 may be integral to the door. Similarly, damper controls 120 and 160 can also be included as an integral part of stove 100.

Figure 2:
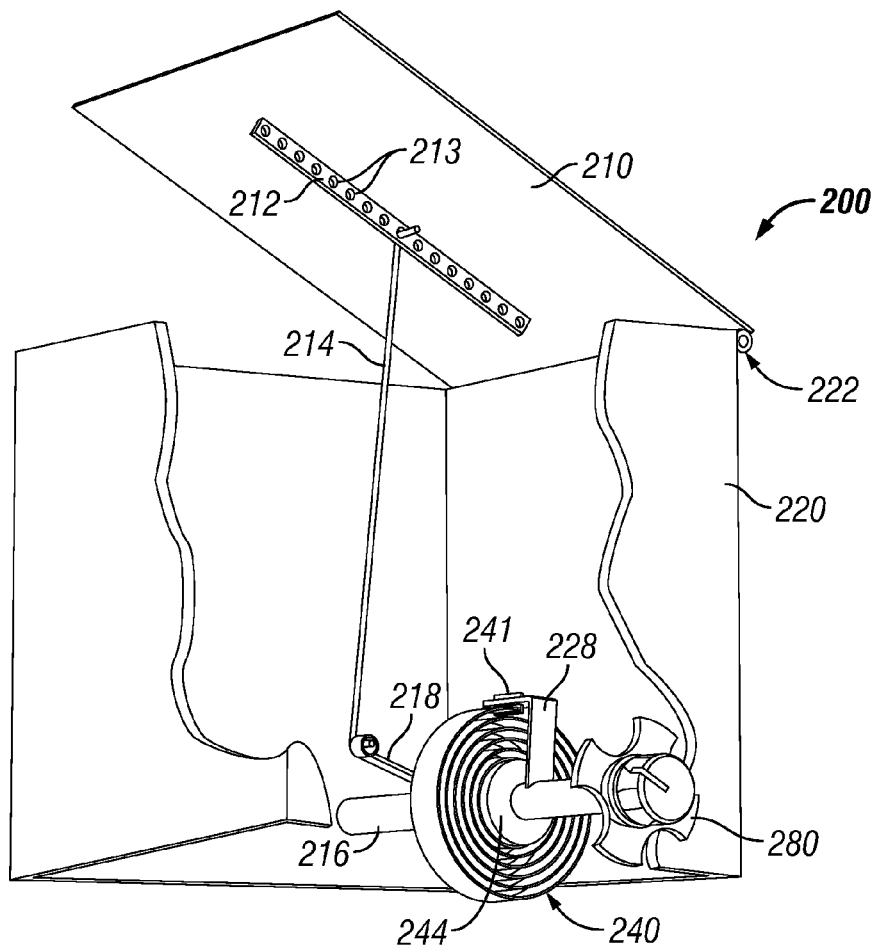
FIG. 2 is a cutaway view of an apparatus having a generally cube-shaped housing according to various embodiments of the present disclosure.

Referring next to FIG. 2, a damper control 200 is illustrated according to various embodiments of the present disclosure. Damper control 200 includes housing 220 and damper 210 connected to housing 220 via hinge 222. Travel adjustment 212 is mounted on damper 210, and allows one end of damper rod 214 to be coupled to damper 210 at different positions along an axis perpendicular to the axis along which damper 210 rotates. The other end of damper rod 214 is connected to lever arm 218, which is connected indirectly to a first end (not illustrated) of coiled spring 240 via sleeve 244. The second end 241 of coiled spring 240 is shown connected to arm 228, which is in turn connected in a fixed relationship to shaft 216. An interior opening of sleeve 244, is positioned about shaft 216 in a manner that allows sleeve 244 to slide freely around shaft 216. Also included is knob assembly 280, which can be used to facilitate rotating shaft 216 to establish a temperature setpoint.

In operation, housing 220 is placed over or within an orifice or opening in a stove chamber. As the temperature of the stove chamber varies, coiled spring 240 expands or contracts. One end 241 of the coiled spring 240 is fixed in position relative to shaft 216, which in turn remains a fixed distance from the opening of housing 242, to which damper 210 is attached via hinge 222. As coiled spring 240 expands or contracts, its first end (not illustrated), which is connected to sleeve 244, causes lever arm 218, which is also connected to sleeve 244, to move. Movement of lever arm 218 applies a force to damper rod 214, which transfers that force to damper 210, causing damper 210 to open or close by rotating about the axis running through the center of hinge 222.

When damper control 200 is initially position, adjustment knob assembly 280 can be used to move damper 210 into a fully open position. Note that in the illustrated embodiment, rotating knob assembly 280 also rotates shaft 216 and arm 228, which in turn pushes on first end 241 of coiled spring 240, causing coiled spring 240 and sleeve 244 to also rotate. Rotation of sleeve 244 causes lever arm 218 to move damper rod 214, thereby opening or closing damper 210. With damper 210 and a fully open position, air can more easily flow through housing 220, and into, or out of, a stove chamber. Allowing air to flow more easily into or out of the stove's chamber allows the temperature of the stove chamber to increase, if there is sufficient fuel.

The temperature of the stove chamber can be monitored, using any suitable means, to determine when the stove chamber reaches a desired temperature. At that point knob assembly 280 can be rotated to close damper 210. Closing damper 210 limits the amount of oxygen available to assist combustion of the fuel, and tends to prevent the temperature in the cooking chamber from rising. The temperature of the cooking chamber, however, may begin to decrease due to decreased combustion of fuel. When that happens, the change in temperature will cause coiled spring 240 to contract, and the force of that contraction can be transmitted to damper 210 through damper rod 214, thereby causing damper 210 rotate towards an open position.

As damper 210 begins opening, additional oxygen is made available to assist in combustion of the fuel, and the temperature of the stove chamber may begin to rise. As the temperature of the stove chamber rises, coiled spring 240 begins to expand, resulting in damper rod 214 being pulled down, having the effect of causing damper 210 to rotate towards a closed position. In this way, damper 210 is opened and closed in response to changes in a stove chamber's temperature, thereby regulating the temperature of the chamber, and tending to maintain a substantially constant temperature within the stove chamber.

In the illustrated embodiment, hinge 222 is connected along edge of damper 210, so that damper 210 rotates about an edge axis, but damper 210 can be configured to rotate about a different axis if desired. In some embodiments, if a different axis of rotation is used, travel adjustment 212 can be positioned on either side of the chosen axis of rotation.

Travel adjustment 212 can take various forms. As illustrated, travel adjustment 212 is an elongated bar having holes 213 formed in it to receive one end of damper rod 214. Changing the hole 213 into which damper rod 214 is placed, allows the angle through which damper 210 moves for a given amount of movement of damper rod 214 to be adjusted. This provides one way to control the speed at which damper 210 opens in response to a change in temperature. In other embodiments, travel adjustment 212 may be formed as an integral part of damper 210. For example, travel adjustment 212 can be formed as the slot having detent notches (not illustrated) into which one end of damper rod 214 can be inserted. In addition, various different types of catches, pawls, fasteners, or other mechanisms can be used to connect damper rod 214 to damper 210.

Sleeve 244 can be a simple sleeve positioned around shaft 216, or may include any of various different bearing types. In some embodiments, sealed bearings are used to decrease the need to clean and grease bearings, but other types of bearings can be used consistent with the teaching set forth herein. In some embodiments one end of coiled spring 240 is connected to sleeve 244 by sliding one end of the coiled spring through a slot in sleeve 244, and bending the end to hold it in place. The same method can be used to connect coiled spring 240 to arm 228. However, in other embodiments other connection methods, including but not limited to welding, pinning, riveting, or the like.

It should also be noted that in some embodiments, first end 241 of coiled spring 240 may be connected directly to a sidewall of housing 220, rather than being connected to shaft 216. In some such embodiments, connecting coiled spring 240 directly to the sidewall of housing 220 removes some of the utility of knob assembly 280, because shaft 216 need not be rotated to close damper 210 to establish the temperature set point.

Various materials can be used in implementing various embodiments of the present disclosure. For example, housing 220, damper 210, damper rod 214, and other portions of damper control 200 can be formed of a metal, such as aluminum, tin, or some other suitable metal or alloy, such as steel. In some embodiments, various portions of damper control 200 can be formed of various combinations of a heat resistant plastic or other material. Additionally, various coatings can be provided both on the inside and outside of housing 220 to provide temperature resistance for handling of the unit when in operation, or for another desired purpose.

It should also be noted that while at least one embodiment of the present disclosure uses a bimetallic coiled spring as an expandable member responsive to temperature changes, other embodiments can be implemented in which other types and shapes of expandable members can be employed, in place of, or in addition to, coiled spring 240. For example, damper rod 214 could itself be constructed as a spring or other expandable material that can be used to open and close damper 210 in response to changes in temperature. Or a substantially straight elongated member, which bends in response to changes in temperature, can be used in place of coiled spring 240 without departing from the spirit and scope of the present disclosure. Other adaptations implementing the teachings herein are also possible.

Figure 3:
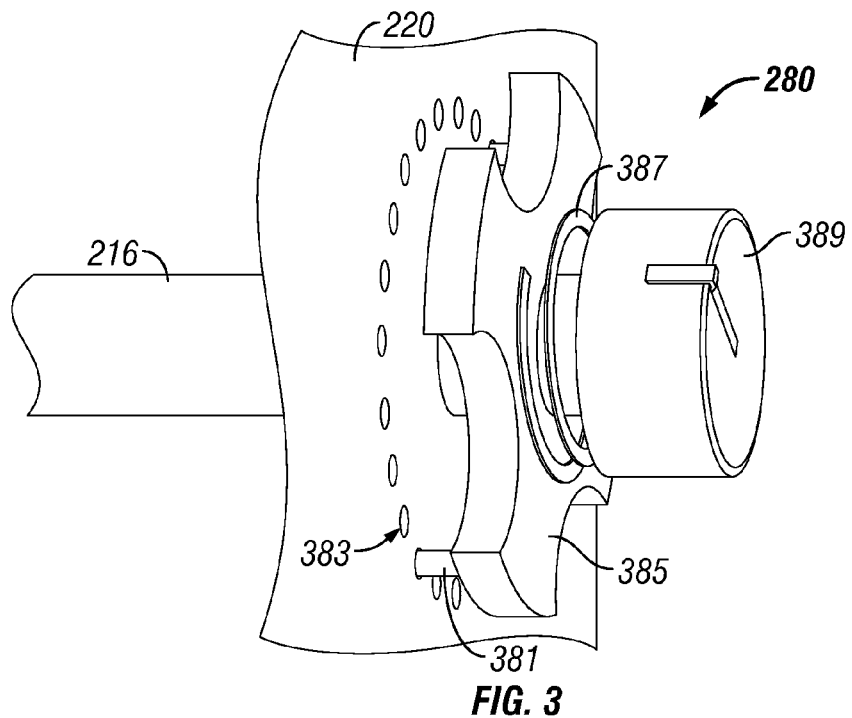
FIG. 3 is a perspective view of an adjustment knob according to various embodiments of the present disclosure.

Referring next to FIG. 3 a knob assembly 280 according to various embodiments of the present disclosure will be described in greater detail. Knob assembly 280 includes knob 389, compression spring 387, a movable détente portion 385 including pin 381, and détente holes 383, which may be formed in a plate connected to housing 220 (FIG. 1), drilled directly into a surface of housing 220, or otherwise. Knob assembly 280 is connected to a portion of shaft 216 protruding through housing 220. In some embodiments, however, knob assembly 280 protrudes through housing 220, and connects to shaft 216, which does not.

In operation, movable détente portion 385 can be pulled away from housing 220 to release pin 381 from détente holes 383. Knob 389 and movable détente portion 385 can be rotated until shaft 216 is in a desired position, at which point movable détente portion 385 is released so that pin 381 engages détente holes 383. Compression spring 387 holds movable détente portion 385 in place, thereby preventing shaft 216 from slipping. In some embodiments, pin 381 can take the form of a ball or protrusion formed on, or attached to, movable détente portion 385, and holes 383 can take the form of depressions configured to matingly engage the ball or protrusion.

Figure 4:
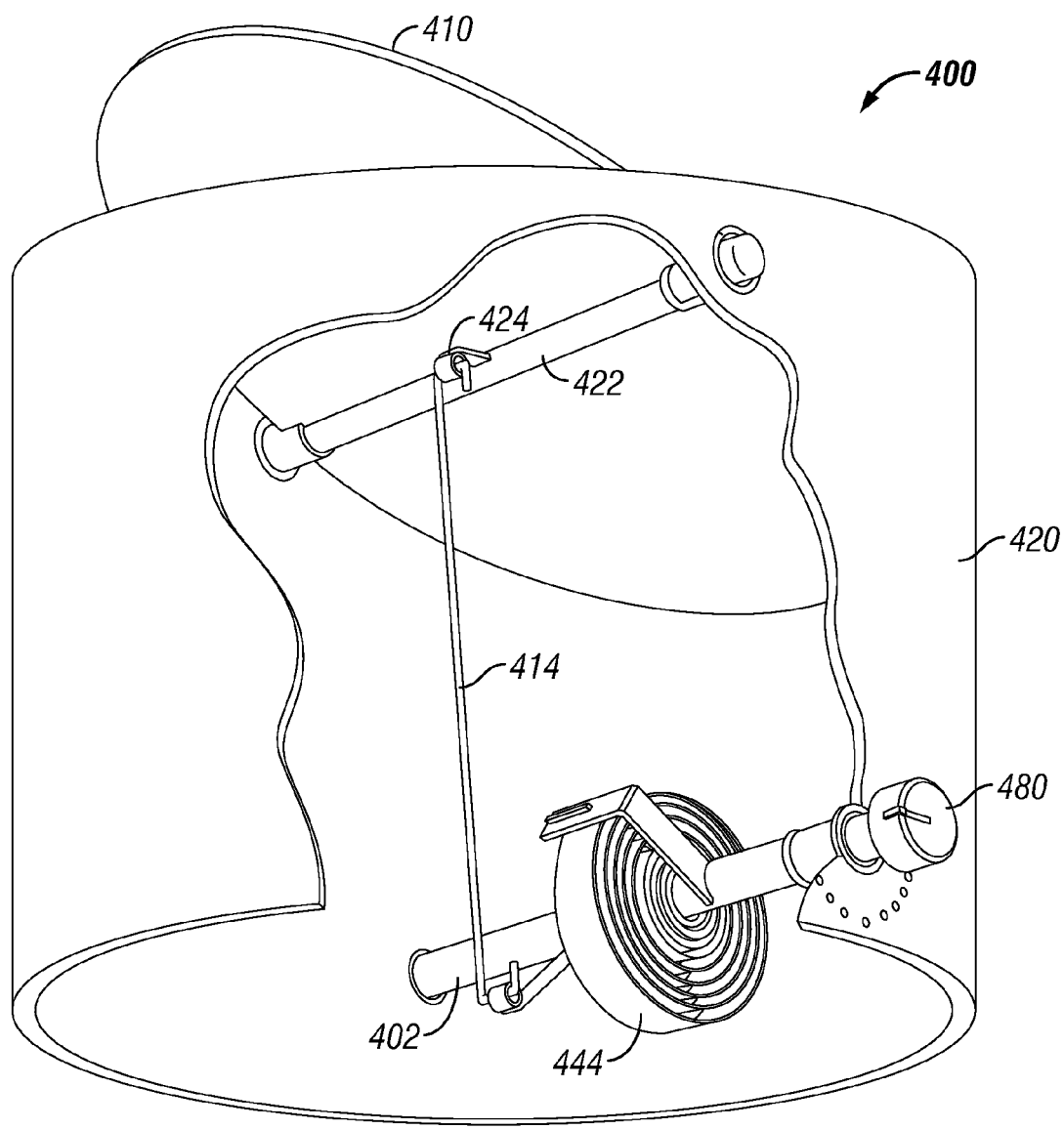
FIG. 4 is a cutaway view of an apparatus having a generally cylindrical shape according to various embodiments of the present disclosure.

Referring next to FIG. 4, embodiments of a damper control having an axis of rotation somewhere other than the edge of the damper are discussed. Damper control 400 includes a generally cylindrical housing 420, damper 410, damper rod 414, main shaft 402, expandable member 444, and knob assembly 480.

Damper 410 includes damper shaft 422, and is generally circular, so that when closed damper 410 substantially covers the opening in the top of housing 420. Damper shaft 422 is mounted on or formed as an integral part of damper 410, and provides a rotatable connection between damper 410 and housing 420. When damper 410 rotates towards an open or closed position, it does so along an axis that runs through the center of Damper shaft 422. In the illustrated embodiment, damper shaft 422 includes on 424 used to connect damper rod 414 to damper shaft 422.

When damper control 400 is coupled to an opening of a stove chamber, changes in the temperature of the stove chamber can cause expandable member 444 to expand or contract. Expansion and contraction of expandable member 444 causes damper rod 414 to move, which in turn causes damper 410 to rotate towards and open or closed position. Knob assembly 480 can be used to rotate shaft 402, thereby closing damper 410, and establishing a temperature set point.

Figure 5:
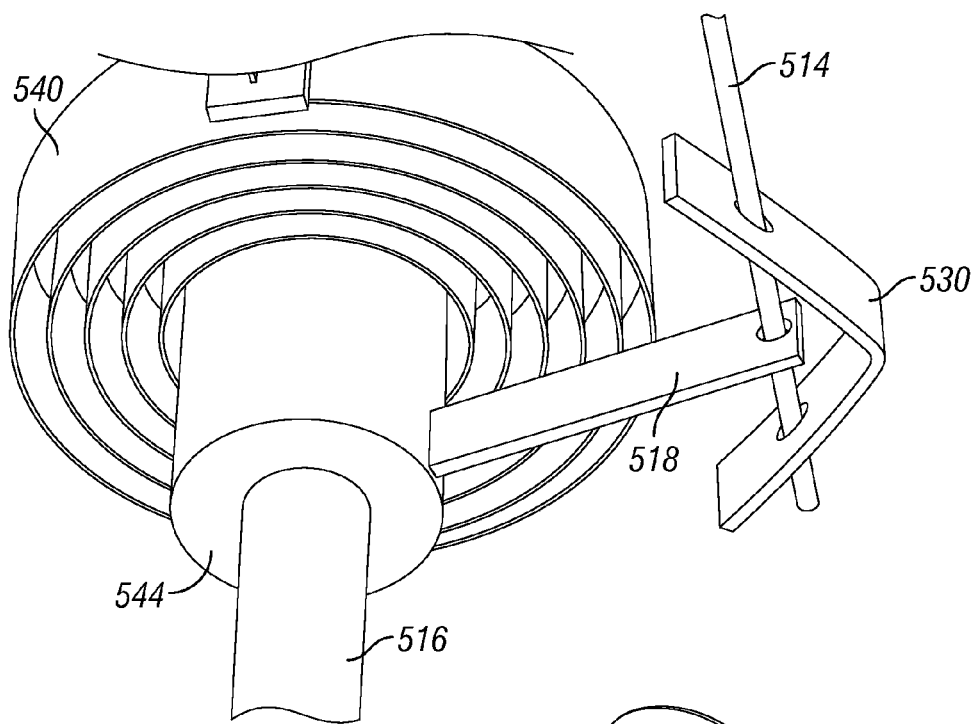
FIG. 5 is a perspective view of a temperature responsive coil connected to the damper rod according to various embodiments of the present disclosure.

Referring next to FIG. 5 a particular means of coupling a damper rod to an expandable member is illustrated according to embodiments of the present disclosure. In the illustrated embodiment, expandable member 540 is connected to a damper rod 514 through sleeve 544, and lever 518. Lever 518 includes an opening formed in one of its ends, through which damper rod 514 can be slid. Damper rod 514 can also be slid through spring clip 530, which is used to hold damper rod 514 in place. It should be appreciated that other types of clips, pins, fasteners, pawls, and détente mechanisms can be used to secure damper rod 514 to lever 518. Additionally, more permanent types of connections, including welding can also be used if desired. However, using spring clip 530 provides one way of adjusting the temperature set point.

The other end of lever 518 is connected to sleeve 544, which is mounted on shaft 516. Expendable member 540 is connected at one end to sleeve 544, and at the other end to an arm, bracket, or portion of a housing that remains a fixed distance from an opening of the housing.

Figure 6:
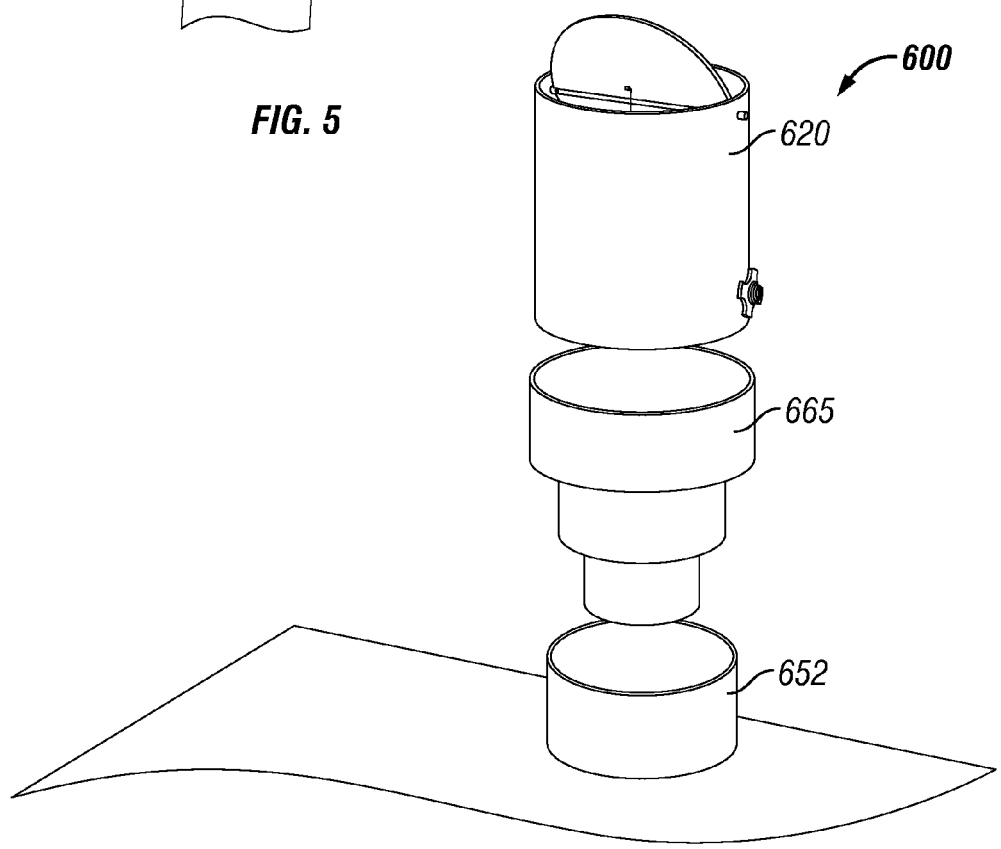
FIG. 6 is a perspective view of a kit including a temperature regulating apparatus and an adapter according to various embodiments of the present disclosure.

Referring next to FIG. 6 is a kit 600, according to various embodiments of the present disclosure. Kit 600 includes a damper control unit 620 and adapter 665 constructed to facilitate connection of damper control unit 620 to a stove opening 652. Adapter 665 is a graduated adapter configured to fit within a correspondingly shaped stove opening 652. The graduated portion of adapter 665 allows it to fit within generally circular stove openings having various different sizes.

In other embodiments, adapter 665 can be reverse graduated, such that the smallest end of adapter 665 connects to damper control unit 620, with the larger end configured to fit over the outside of a pipe or other protrusion forming a stove opening 652. In some embodiments, rather than being graduated in steps, adapter 665 can be configured to have smooth graduations, or a combination of smooth graduation and steps. Thus, for example, adapter 665 could be cone shaped, to facilitate sliding into stove opening 652 up to the point where adapter 665 fits snugly within stove opening 652.

A cylindrical damper control unit 620 and corresponding cylindrical adapter 665 are illustrated, but various other shapes can also be employed. For example, in some embodiments, damper control unit 620 has a generally rectangular shaped cross section, and adapter 665 has a corresponding rectangular shaped opening. Such an adapter 665 can be used to connect to different sizes of stove openings 652 with substantially square cross-sections. An adapter 665 with a square cross-section can be graduated in a manner similar to an adapter 665 with a circular cross section. In some embodiments, one opening of adapter 665 can be adapted to fit a damper control unit 620 having a square cross-section while the other end is configured to mate with a stove opening 652 having a circular or other shaped cross-section, and vice versa.

Figure 7:
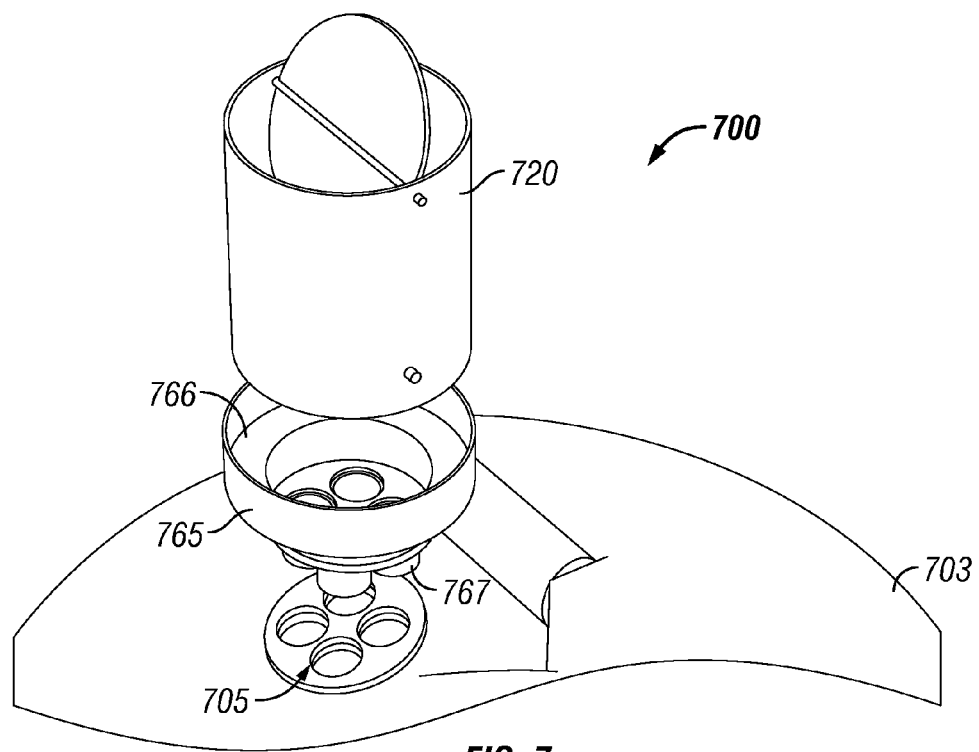
FIG. 7 is a perspective view of a kit including a temperature regulating apparatus and an adapter having multiple opening configured to mate with openings in a kettle-type grill top according to various embodiments of the present disclosure.

Referring next to FIG. 7, a kit 700 including a damper control unit 720 and an adapter 765 is discussed. Adapter 765 allows damper control unit 720 to be connected to air vent 705. In the illustrated embodiment, air vent 705 includes multiple separate openings formed in the lid of a kettle-type grill. When the lid of the grill is placed on a lower kettle portion (not illustrated), a cooking chamber is formed. Adapter 765 has a single top opening 766 on its top side to configured to mate with the bottom openings of damper control unit 720, and multiple bottom openings 767 on its bottom configured to mate with multiple holes forming air vent 705.

It will be appreciated that bottom openings 767 can have different arrangements and shapes, as necessary or desirable to mate with corresponding openings in air vent 705. Likewise, top opening 766 can be configured to mate with differently shaped damper control units. Furthermore, various clasps, hinges, and fasteners can be included on either or both damper control unit 720 or adapter 765 to facilitate firm engagement of adapter 765 to control unit 720.

Figure 8:
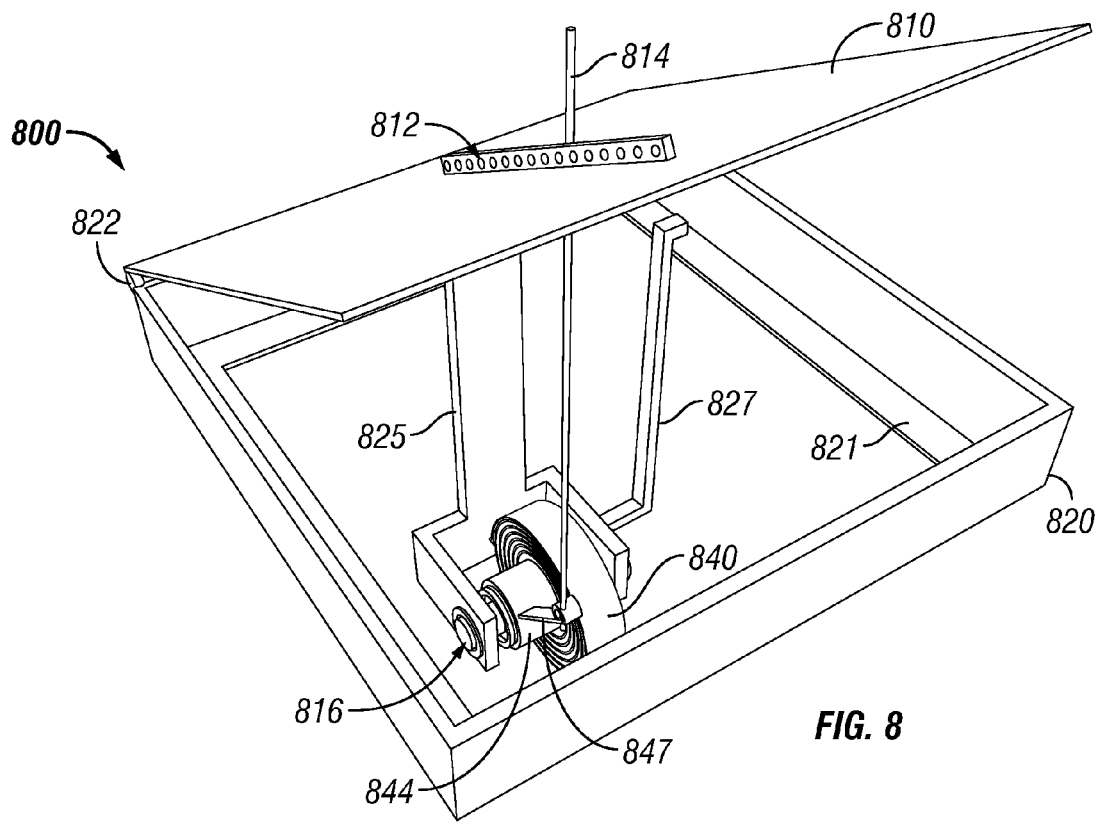
FIG. 8 is a perspective view of a temperature regulating apparatus having a frame-type housing according various embodiments of the present disclosure.

Referring next to FIG. 8, a damper control 800 having a frame-type housing 820 will be discussed according to various embodiments of the present disclosure. Damper control 800 includes housing 820, which includes lip 821, beam portion 825, and support portion 827 mounted on lip 821; bi-metallic spring 840 mounted on bearing sleeve 844; damper 810, which is connected to housing 820 by hinge 822; and shaft 816, which supports bearing sleeve 844 and bi-metallic spring 840. In at least one embodiment, one end of hi-metallic spring 840 is affixed to housing 820 at beam portion 825, and the other end is affixed to the outside of bearing sleeve 844.

Lip 821 can rest on top of an opening in a stove chamber (not illustrated), while beam portion 825 extends down into the stove chamber or into a conduit (not illustrated) connected to the stove chamber, and through which air can flow into or out of the stove chamber. When damper 810 is in a closed position, the opening in the stove chamber can be substantially covered, thereby limiting the flow of air into or out of the stove chamber. Note that in some embodiments, lip 821 is not included.

In some embodiments, shaft 816 is fixed, and does not rotate. Bearing sleeve 844 rotates about shaft 816, and allows damper rod 814 to move up or down in response to expansion or contraction of bi-metallic spring 840. In other embodiments, bearing sleeve 844 can be omitted, and shaft 816 can be rotatably mounted to beam portion 825. In some such embodiments, lever arm 847 can be connected directly to shaft 816.

In the illustrated embodiment, damper rod 814 extends through damper 810, and is positioned next to travel adjustment 812, which is affixed to or formed on the outside of damper 810. A cotter pin, clamp, latch, spring, détente or other suitable mechanism can be used to attach one end of damper rod 814 to travel adjustment 812. In some cases, once a desired operating temperature of a stove chamber is reached, damper 810 can be closed and damper rod 814 attached to travel adjustment 812. If the temperature of the stove chamber begins to decrease, expansion of bi-metallic spring 840 can cause damper rod 814 to lift damper 810. Further changes in temperature will cause damper 810 to begin opening or closing, so that a substantially constant temperature is maintained within the stove chamber.

Figure 9:
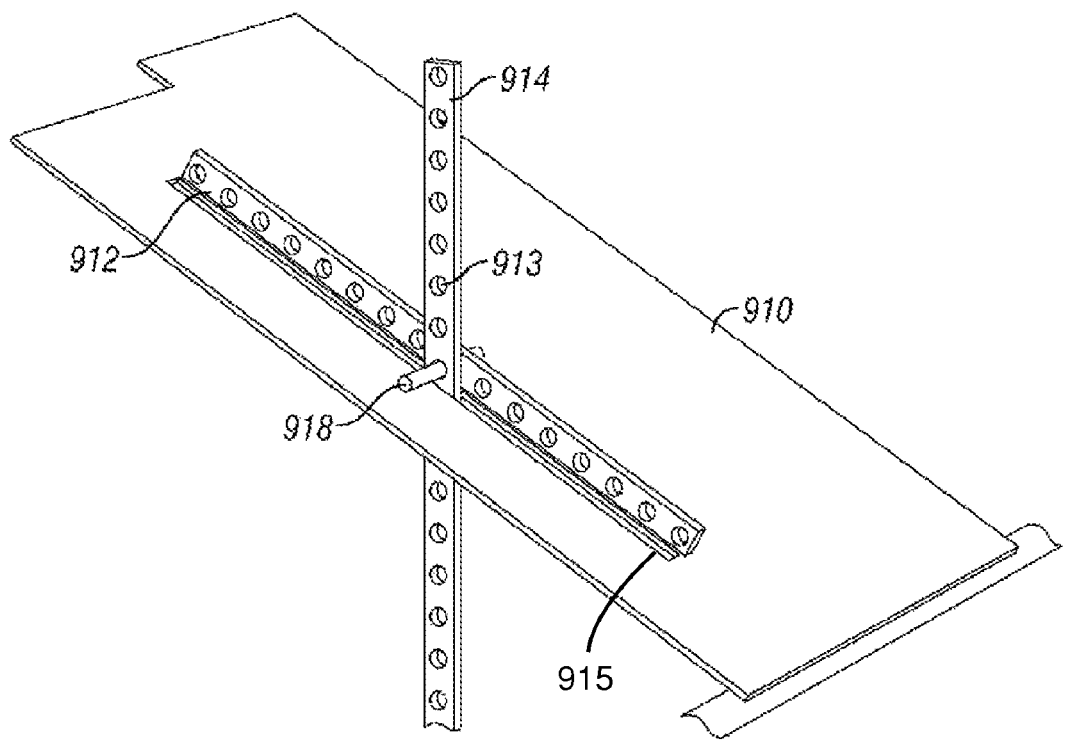
FIGS. 9 and 10 are perspective views of adjustable damper rod connections according to various embodiments of the present disclosure.
Figure 10:
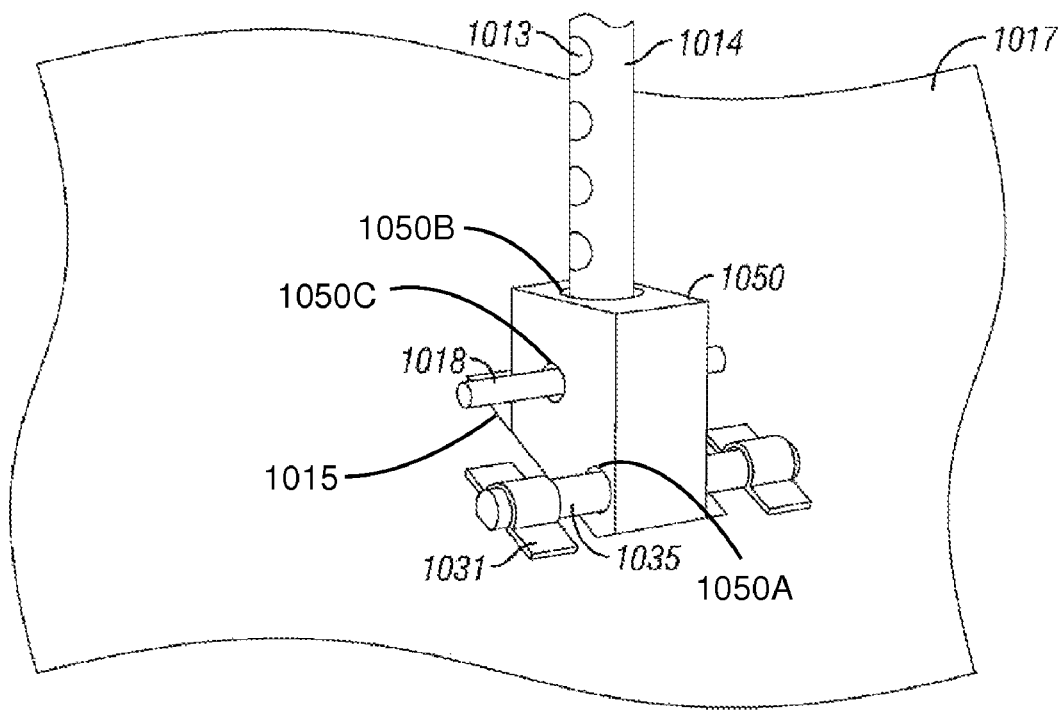

Referring next to FIGS. 9 and 10, various embodiments allowing adjustment of a temperature set point by fixing a damper at different points along the length of a damper rod are discussed according to various embodiments of the present disclosure. In FIG. 9, damper rod 914 is attached to damper 910 by inserting pin 918, which may be a dowel, screw, bolt, or similar object through holes 913 formed in both travel adjustment 912 and damper rod 914. The damper 910 has an opening 915 formed therein through which the damper rod 914 can slide prior to the damper rod 914 being engaged with the damper 910. The holes 913 of the travel adjustment 912 are located at a top side of the damper 910. In FIG. 10, block 1050 is fastened to damper 1017 using a bar 1035 and a pair of eye straps 1031. The bar 1035 extends through a first hole 1050A of the block 1050 and is sectored to the damper 1017 by the eye straps 1031. Damper rod 1014 includes a series of holes 1013 along its length, and can be pinned to block 1050 with pin 1018. The damper rod 1014 extends through a second hole 1050B in the block 1050. The damper 1017 has an opening 1015 formed therein through which the block 1050 and the damper rod 1014 extend. The opening 1015, the damper rod 1014, and the block 1050 are jointly configured for allowing the block 1050 to pivot about the rod 1035 and for allowing the damper rod 914 to slide with respect to the block 1050 prior to the block 1050. Third hole 1050C in the block 1050, through which pin 1018 is engaged with holes 1013 of the damper road 1014, is located at a top side of the damper 1017. Dampers 910 and 1017 can be moved to a closed or substantially closed position, and damper rods 914 and 1014 can be pinned in place to establish a temperature setpoint.

In some embodiments the temperature can be maintained within 5-15 degrees Fahrenheit, depending on the amount of fuel, the proximity of the damper control to the heat source, the adjustment mechanism used (for example a rotatable shaft, a damper rod adjustment or both), the size and type of expandable member used; the heat capacity of materials used in construction; the angle at which the damper rod is connected to the damper; and numerous other factors. Assuming sufficient fuel, and that combustion is not extinguished, it is anticipated that in many cases the temperature within a stove chamber to which a device constructed according to the present disclosure is coupled can be maintained to within a range of about 10% of the temperature setpoint.

In various embodiments, the temperature setpoint can be established by setting the damper to a partially closed position using any of the mechanisms described herein or their equivalents. In some such embodiments, the temperature is thereby regulated both above and below the desired temperature by allowing the damper to close if the temperature of the stove chamber increases and also open in response to a decrease in the desired temperature. In some such embodiments, the temperature of the stove chamber when the damper is fully closed may be slightly higher than the desired temperature.

In the preceding detailed description, reference has been made to the accompanying drawings that foam a part hereof, and in which are shown by way of illustration specific embodiments in which the invention may be practiced. These embodiments, and certain variants thereof, have been described in sufficient detail to enable those skilled in the art to practice the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A damper control apparatus constructed as a standalone unit that is mountable in a unitized configuration on an exterior portion of a stove over an exhaust port thereof for regulating airflow therethrough dependent on temperature of air passing through the exhaust port, the damper apparatus comprising:
    a housing adapted to be mounted on the stove over the exhaust port thereof, wherein the housing includes a central passage through which exhaust gasses from the exhaust port of the stove can flow;
    a damper mounted entirely on the housing, wherein the damper is rotatably coupled to the housing such that the damper can rotate about a first axis between an open position and a closed position;
    a damper adjustment shaft mounted entirely on the housing, wherein the damper adjustment shaft is rotatable about a second axis; and
    an expandable member coupled between the damper adjustment shaft and the damper within the central passage of the housing, wherein the expandable member and the damper is mounted entirely on the housing and the damper adjustment shaft is mounted entirely through the expandable member and the housing, wherein the expandable member is responsive to changes in temperature, wherein the expandable member is located at a position between the damper and an opening of the housing at which the exhaust gases enter the central passage of the housing, and wherein the expandable member comprises a first end portion coupled to the damper and a second end portion coupled to the damper adjustment shaft and wherein the expandable member moves responsive to changes in temperature and wherein movement of the expandable member moves the damper;
    wherein, the damper, the damper adjustment shaft, and the expandable member are each coupled to only each other and the housing for enabling regulation of the airflow through the exhaust port when the damper control apparatus is mounted on the stove.

2. The apparatus of claim 1, further comprising:
    a connecting rod having a first end connected to the first end portion of the expandable member and a second end connected to the damper.

3. The apparatus of claim 2, further comprising:
a travel adjustment configured to adjust a position of the second end of the connecting rod in relation to the damper.

4. The apparatus of claim 1 wherein:
the expandable member includes an elongated temperature sensitive strip of material wound in a rolled coil configuration having a central opening;
the second end portion of the expandable member is located within the central opening; and
the damper adjustment shaft is connected to the second end portion of the expandable member within the central opening such that rotating the damper adjustment shaft causes the damper to move.

5. The apparatus of claim 4, further including:
a knob fixed to a first portion of the damper adjustment shaft extending outside the housing, the knob comprising a movable portion of a detent mechanism configured to mate with a portion of the detent mechanism having a fixed position relative to the housing.

6. The apparatus of claim 4, wherein:
the damper adjustment shaft can be rotated to establish a temperature setpoint by moving the damper to a closed position during a time when a chamber of the stove is at an operating temperature; and
the expandable member varies a position of the damper based on variations in a temperature of the exhaust gasses to maintain the chamber of the stove substantially at the temperature setpoint.

7. The apparatus of claim 1, further comprising:
an adapter having a generally tubular first end configured to be coupled to the inlet of the housing, and a second end configured to be fitted over the exhaust port of the stove.

8. The apparatus of claim 1, further comprising:
an adapter having a generally tubular first end configured to be coupled to the inlet of the housing, and a second end configured to be fitted into the exhaust port of the stove.

9. An apparatus for mechanically regulating a temperature within a stove chamber, the apparatus being constructed as a standalone unit that is mountable in a unitized configuration on an exterior portion of the stove chamber over an exhaust port of the stove chamber for regulating airflow through the stove chamber dependent upon temperature of air passing through the exhaust port, the apparatus comprising:
a tube having a first opening, a second opening, and a central passage extending therebetween, wherein the tube is adapted for being coupled to the stove chamber such that an exhaust port orifice of the stove chamber is in fluid communication with the first opening;
a damper moveably mounted entirely on the tube adjacent to the second opening;
a temperature adjustment structure mounted entirely on the tube, wherein the temperature adjustment structure includes a movable adjustment member having a first portion located outside of the central passage and a second portion located within the central passage;
a temperature-responsive coil and the damper mounted on the second portion of the movable adjustment member, wherein the temperature-responsive coil is mounted entirely on the tube and the temperature adjustment structure is mounted entirely through the coil and the tube, wherein the temperature-responsive coil is located at a position between the damper and an inlet into the central passage of the tube, wherein the temperature-responsive coil is in a rolled configuration with a central opening, wherein the second portion of the movable adjustment member extends into the central opening of the temperature-responsive coil, wherein a first end portion of the temperature-responsive coil is coupled to the second portion of the movable adjustment member; and
an elongated force-transfer member comprising a first portion coupled only to a second end portion of the temperature-responsive coil and a second portion coupled only to the damper and wherein the temperature-responsive coil moves responsive to changes in temperature and wherein movement of the temperature-responsive coil moves the damper;
wherein, the damper, the temperature adjustment structure, the temperature-responsive coil, and the elongated force-transfer member are each coupled to only each other and the tube for enabling regulation of the airflow through the exhaust port when the damper control apparatus is mounted on the stove chamber.

10. The apparatus of claim 9, further comprising:
an adapter having a first portion configured to be coupled to the first opening of the tube, and a second portion configured to be coupled to the orifice of the stove chamber.

11. The apparatus of claim 9 wherein:
the movable adjustment member is a shaft;
the shaft is rotatable about a shaft rotation axis;
an axis about which the temperature-responsive coil is rolled extends substantially parallel to the shaft rotation axis; and
rotating the shaft establishes a temperature setpoint.

12. The apparatus of claim 11, further comprising:
a sleeve positioned about the shaft; and
wherein second portion of the temperature-responsive coil is connected to the sleeve.

13. The apparatus of claim 12, wherein the sleeve comprises a bearing.

14. The apparatus of claim 9, further comprising:
a travel adjustment configurable to change an angle through which the damper rotates in response to movement of the elongated force-transfer member.

15. The apparatus of claim 9 wherein:
the damper has an opening formed therein the damper;
the elongated force-transfer member extends through the opening such that the second portion of the elongated force-transfer member is located at a top side of the damper;
the damper includes a force-transfer member mounting structure at its top side; and
the second portion of the elongated force-transfer member is pivotably attached to the damper through the force-transfer member mounting structure.

16. The apparatus of claim 15 wherein:
the damper is pivotable attached to the tube;
the force member mounting structure pivots about axis extending substantially parallel to a pivot axis of the damper;
the elongated force-transfer member extends through a force-member receiving passage within the force member mounting structure.

17. The apparatus of claim 16 wherein:
the elongated force-transfer member is selectively engagable with the force member mounting structure at a plurality of positions along a length of the elongated force-transfer member.

18. The apparatus of claim 16, further comprising:
a plurality of openings formed along a length of the elongated force transfer member, and a pin configured to be placed through at least one of the plurality of openings to adjustably couple the elongated force transfer member to the force member mounting structure.

19. An apparatus constructed as a standalone unit that is mountable in a unitized configuration on an exterior portion of a stove over an exhaust port thereof through which heated air from within the stove is exhausted for regulating airflow through the stove dependent upon temperature of the heated air, the apparatus comprising:
- a housing configured to be attached to the stove such that a central passage of the housing is in fluid communication with the exhaust port through which the heated air from within the stove is exhausted;
- an expandable member responsive to changes in temperature, wherein the expandable member is located within the central passage adjacent to an inlet of the central passage, wherein the expandable member has a first end portion and a second end portion, wherein the expandable member is wound around a central opening thereof, and wherein the first end portion of the expandable member is located within the central opening;
- a damper mounted entirely on the housing adjacent to an outlet of the central passage, wherein the damper is rotatably coupled to the housing such that the damper can rotate about a first axis between an open position and a closed position;
- means for adjusting a temperature at which a chamber of the stove is maintained, wherein the temperature adjusting means is mounted entirely on the housing and includes a movable adjustment component having a first portion located outside of the central passage and a second portion located within the central passage and wherein the movable adjustment component extends through the central opening of the expandable member;
- means for coupling the first end portion of the expandable member to the movable adjustment component of the temperature adjusting means; and
- means for coupling the second end portion of the expandable member to the damper such that a position of the damper changes based on expansion and contraction of the expandable member and wherein the expandable member moves responsive to changes in temperature and wherein movement of the expandable member moves the damper;
- wherein, the expandable member, the damper, the means for adjusting the temperature, the first end portion coupling means, and the second end portion coupling means are each coupled to only each other and the housing for enabling regulation of the airflow through the exhaust port when the damper control apparatus is mounted on the stove.

20. The apparatus of claim 19, further comprising:
means for adjusting an amount of movement of the damper per unit change in temperature.

21. The apparatus of claim 19, further comprising:
means for coupling the housing to the stove.

22. The apparatus of claim 19, wherein the means for adjusting a temperature at which a chamber of the stove is maintained comprises a means for adjusting the damper to a closed position during a period of time when the chamber of the stove is at the temperature to be maintained.

23. The apparatus of claim 22, wherein the means for adjusting the damper comprises:
- a damper having an opening formed therein, and through which a damper rod can slide prior to the damper rod being engaged with the damper; and
- a means for engaging different portions of the damper rod with the damper, such that after being engaged further movement of the damper rod results in movement of the damper.

* * * * *